INVENTOR.
Howard E. Chana
BY
Ronald L. Phillips
ATTORNEY

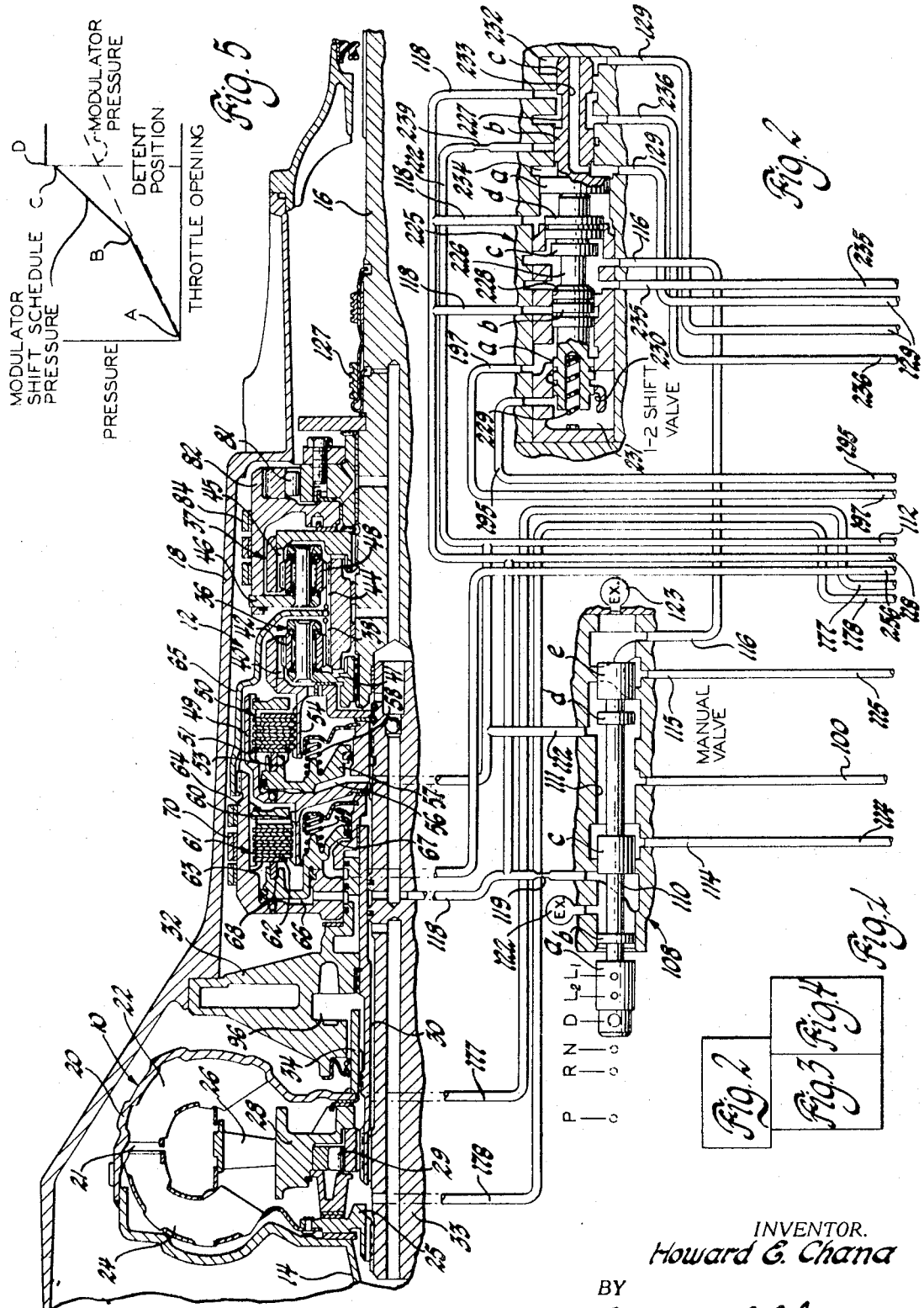

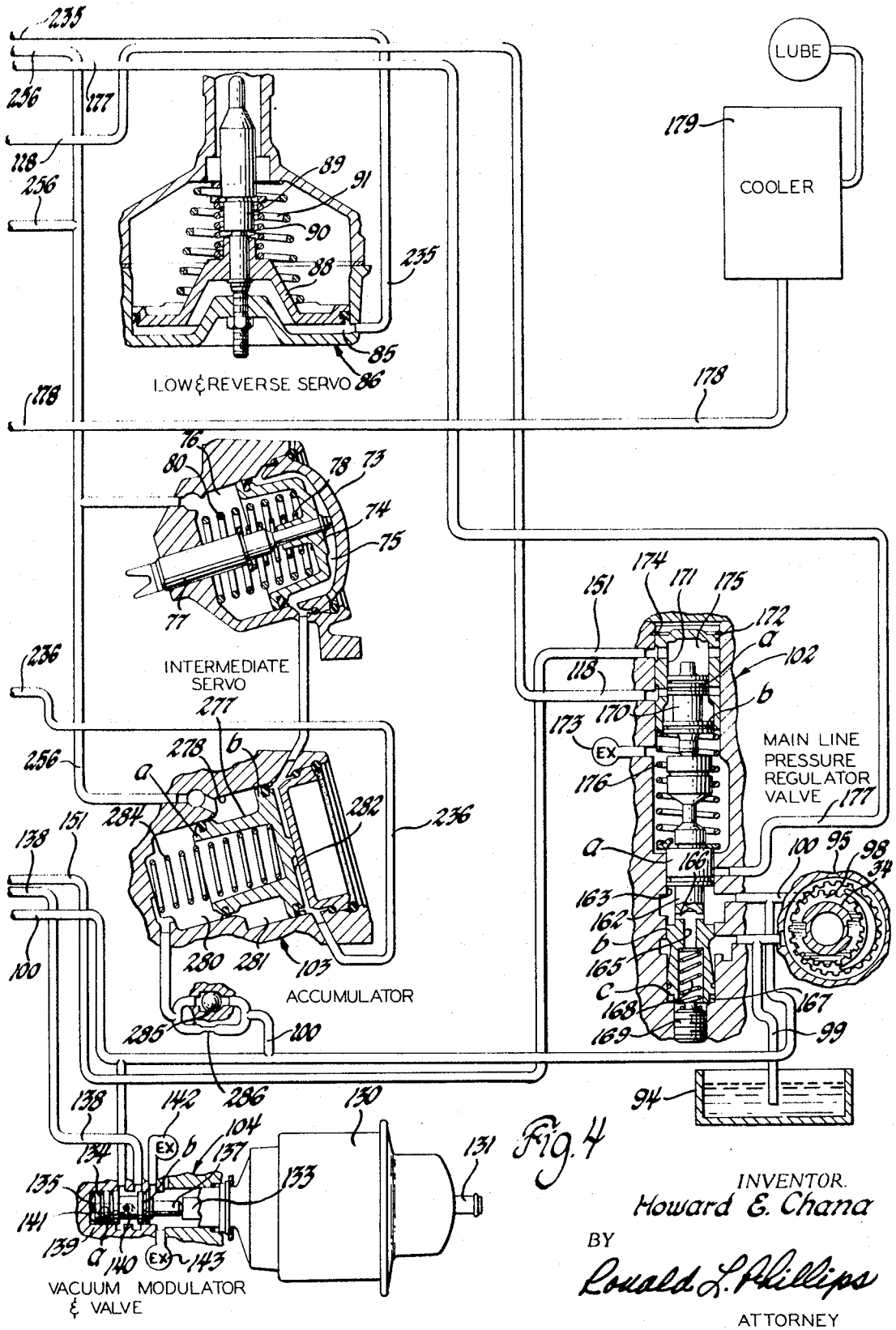

United States Patent Office 3,625,090
Patented Dec. 7, 1971

3,625,090
TRANSMISSION CONTROL
Howard E. Chana, Flint, Mich., assignor to General
Motors Corporation, Detroit, Mich.
Filed Feb. 24, 1970, Ser. No. 13,718
Int. Cl. B60k 21/08
U.S. Cl. 74—864
6 Claims

ABSTRACT OF THE DISCLOSURE

An automatic transmission control providing for shifting between three forward drives wherein there is provided part engine throttle sequential upshifting, part engine throttle downshifting from the high to the intermediate drive, downshifting from intermediate to the low drive at a predetermined vehicle speed and coast downshifting from the high drive directly to the low drive at a predetermined vehicle speed.

---

Figure 3:
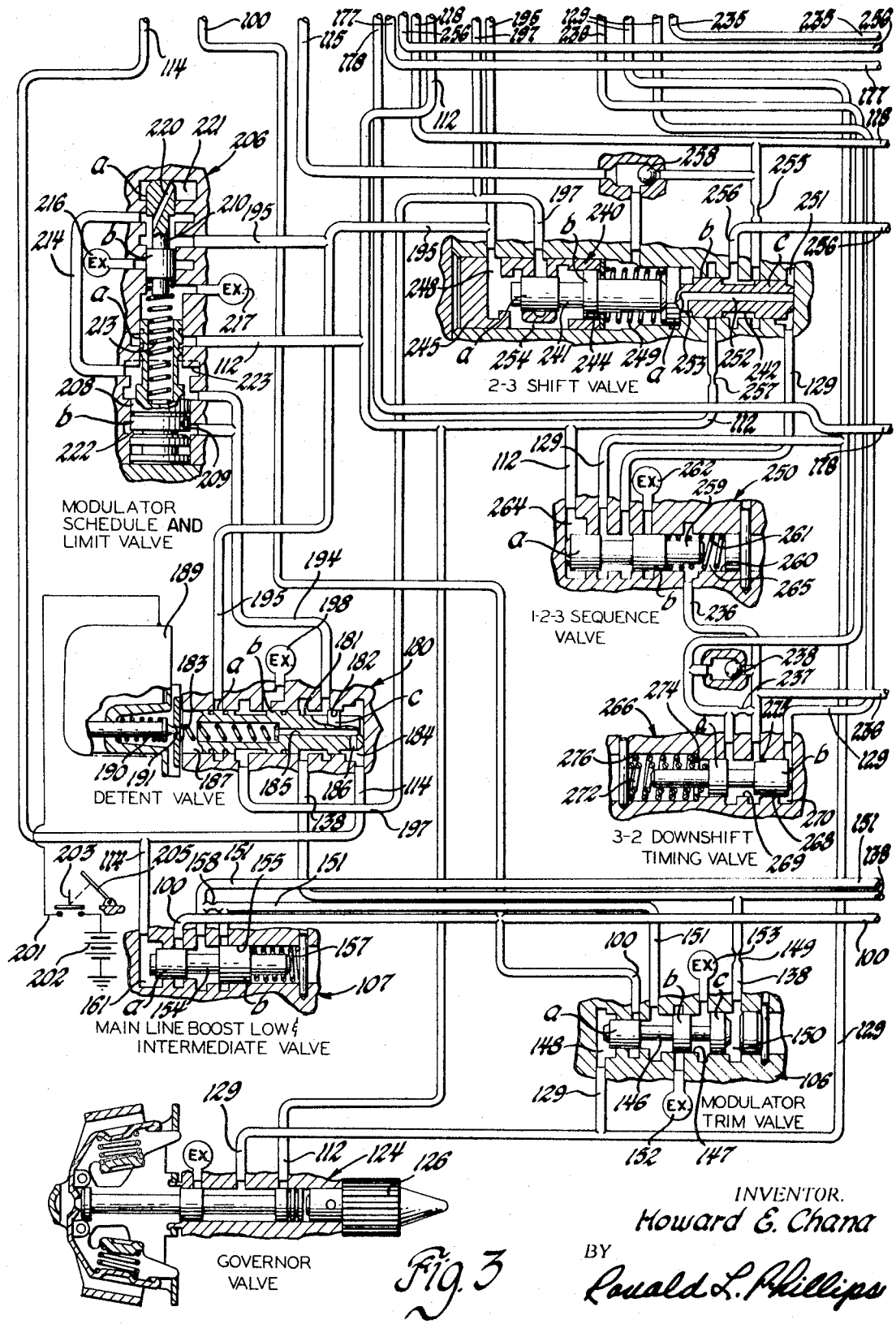

This invention relates to transmissions and more particularly to transmission controls.

The transmission control according to the present invention is for automatically controlling a transmission which has a low forward drive established by engagement of a one-way type device, an intermediate forward drive which is established by engagement of a friction band type device and a high forward drive which is established by engagement of a friction plate type device. The transmission control has shift valves which provide for part engine throttle sequential upshifting, part engine throttle downshifting from the high to the intermediate drive and downshifting from the intermediate to the low drive at a predetermined vehicle speed. The shift valves also operate to effect a downshift from the high drive directly to the low drive to avoid engaging the friction band type device when the engine throttle is closed and the vehicle speed reduces to a predetermined value to provide smooth coast downshifting. The transmission control further includes a sequence valve which, by its control over the operation of the shift valve arrangement, assures sequential upshifting through all of the drives.

An object of the present invention is to provide a new and improved transmission control.

Another object is to provide a transmission control providing for smooth coast downshifting.

Another object is to provide in a transmission control a shift valve system providing sequential upshifting and downshifting and also nonsequential downshifting for smooth coast downshifts.

Another object is to provide a transmission control having a valve system for providing a coast downshift whose smoothness is provided by shifting drive establishment from one drive establishing device to another without engaging a friction band type device.

Another object is to provide in a transmission control a shift valve and sequence valve arrangement that provides for shifting between three drives including an intermediate drive established by engagement of a friction band type device by part engine throttle sequential upshifting, part engine throttle downshifting from the high to the intermediate drive, downshifting from the intermediate to the low drive at a predetermined vehicle speed and coast downshifting from the high drive directly to the low drive at a predetermined vehicle speed.

These and other objects of the invention will be more apparent from the following description and drawing in which:

There is shown a longitudinal sectional view of a transmission drive train in FIG. 2 and a schematic of a hydraulic control system according to the present invention for controlling this transmission drive train when FIGS. 2, 3 and 4 are arranged in accordance with the diagram shown in FIG. 1.

FIG. 5 graphically illustrates the shift schedule characteristics provided by the control system.

TRANSMISSION DRIVE TRAIN ARRANGEMENT

The control system according to the present invention is particularly suited for controlling vehicle transmissions of the type shown in FIG. 2 which generally comprises a hydrodynamic torque converter 10 and range unit 12 which cooperatively provide three forward drives and one reverse drive between the transmission's rotary input member 14 and rotary output member 16, the latter member being a shaft. These drive train components are housed in a transmission housing 18 and in the vehicle installation, the input member 14 is driven by the vehicle's engine and the output member 16 is connected to drive the vehicle's propelling wheels.

In the converter 10, the input member 14 serves as a front cover for this unit and is connected to an impeller cover 20 which together with front cover 14 enclose a fluid chamber 21. In fluid chamber 21 there are provided a series of pump vanes 22 carried by cover 20, turbine vanes 24 carried by a hub 25 and stator vanes 26 which are supported by a reaction hub 28 and disposed between the inner ends of the turbine and pump vanes. Stator vanes 26 are permitted free rotation in only one direction which is the same direction as the pump and turbine vanes by a one-way brake 29, this direction being the forward direction. One-way brake 29 is disposed between hub 28 and a sleeve 30 which is splined to a front bulkhead 32 that is bolted to the transmission housing. One-way brake 29 which may be of any suitable conventional type prevents reverse rotation of stator vanes 26 by the circulating fluid in the converter. Turbine hub 25 is splined to the front end of a converter output shaft 33 which extends through sleeve 30 to transmit the converter drive to the range unit 12. The converter 10 is a three element converter of conventional type and provides torque multiplication up to coupling speed and fluid coupling operation thereafter in the drive it provides to the range unit 12. A sleeve shaft 34 surrounds sleeve 30 and is welded to cover 20 so that it rotates at engine or transmission input speed. Sleeve shaft 34 is connected to drive the pump of the transmission's control system as described in more detail later.

The range unit 12 comprises a front planetary gear set 36 and a rear planetary gear set 37. The front gear set 36 has a sun gear 38, a ring gear 40 and a carrier 41 carrying a planet pinion 42 meshing with this sun gear and ring gear. The carrier 41 is splined to the front end of output shaft 16. The rear gear set 37 comprises a sun gear 44 integral with sun gear 38 of the front gear set, a ring gear 45 which is splined to output shaft 16 and a carrier 46 carrying a planet pinion 48 meshing with this sun gear and ring gear.

Describing now the drive establishing devices of the range unit 12 which establish the drives, the converter output shaft 33 which serves as the power input to the range unit 12 is splined to a clutch drum 49 of a forward drive clutch 50. The forward drive clutch 50 has clutch plates 51 that are splined to drum 49 and are adapted to engage clutch plates 53 that are splined to a hub 54 which is integral with ring gear 40 of front gear set 36. The plates 51 and 53 are engaged upon admission of fluid pressure to a chamber 56 formed between drum 49 and a piston 57. A release spring 58 biases piston 57 towards its clutch release position.

The converter output shaft 33 also drives a clutch hub 60 of a high and reverse clutch 61, the clutch hub 60 being integral with drum 49 which is splined to shaft 33. The clutch 61 has clutch plates 62 splined to hub 60 that are adapted to engage clutch plates 63 splined to a drum 64 which is connected to sun gears 38 and 44 by a bell-shaped member 65. The plates 62 and 63 are engaged upon admission of fluid pressure to either one of two chambers 66 and 67 which are formed between drum 64 and a piston 68. A release spring 69 biases piston 68 towards its clutch release position.

An intermediate brake 70 grounded to transmission housing 18 is of the band type and is adapted to engage drum 64 by operation of a servo 73 which is shown in FIG. 4. In servo 73, a piston 74 separates an apply chamber 75 from a release chamber 76. Piston 74 is mounted on a piston rod 77 for limited axial movement, the rod 77 being adapted at its left end to transmit the servo's output force to apply or engage band brake 70. Upon admission of fluid pressure to apply chamber 75, an inner spring 78 lightly cushions the transfer of the apply force from the piston to the piston rod during initial movement of the piston while an outer spring 80 provides a release force. When the fluid pressure admitted to apply chamber 75 is also admitted to release chamber 76, the spring 80 releases the brake engagement since the opposing pressure forces on piston 74 are equal.

A one-way brake 81 which may be of any suitable conventional type is grounded to transmission housing 18 and operates to prevent reverse rotation and permit forward rotation of a drum 82 that is connected to carrier 46 of the rear gear set 37. In addition to this holding of the carrier 46, there is provided a low and reverse brake 84 of the band type which is grounded to transmission housing 18 and is adapted to engage drum 82 upon admission of fluid pressure to an apply chamber 85 of a low and reverse servo 86 which is shown in FIG. 4. Fluid pressure in chamber 85 acts on a piston 88 which is mounted on a piston rod 89 for limited axial movement, the rod 89 being adapted at its upper end to transmit the servo's output force to apply or engage band brake 84. An inner spring 90 lightly cushions the apply force from the piston to the piston rod during initial movement of the piston while an outer spring 91 provides a release force.

The above described transmission drive arrangement is operable to provide three forward drives and a reverse drive. For neutral operation, all of the drive establishing devices are released.

For the first or lowest speed range forward drive, only forward drive clutch 50 is engaged to transmit converter drive to ring gear 40 of the front gear set 36. The transmission drive arrangement in this condition has the one-way brake 81 preventing reverse rotation of carrier 46 of the rear gear set 37 so that the transmission output shaft 16 is driven in the forward direction and at a reduced speed by compound action of gear sets 36 and 37. The low and reverse brake 84 may be engaged for low drive to prevent forward rotation of carrier 46 and thereby provide for reverse power flow through the range unit 12 to permit engine braking during vehicle coasting. The second or intermediate speed range forward drive is established by engaging both forward drive clutch 50 and intermediate brake 70. In the intermediate speed range forward drive with the converter drive to ring gear 40 of the front gear set 36 and the sun gear 38 of this gear set braked, the transmission output shaft 16 is driven in the forward direction at a reduced speed and in a speed range higher than that obtainable in the low forward drive. The third or highest speed range forward drive is a direct drive and is established by engaging both the forward drive clutch 50 and the high and reverse clutch 61. This locks up the front gear set 36 so that there is provided a 1:1 or direct speed ratio drive between the input and output of range unit 12. The reverse drive is established by engaging the high and reverse clutch 61 and the low and reverse brake 84. With converter drive to sun gear 44 of the rear gear set 37 and with the carrier 46 of this gear set braked, the transmission output shaft 16 is driven in the reverse direction at reduced speed.

TRANSMISSION CONTROL SYSTEM

The present invention is embodied in the transmission control system shown in FIGS. 2, 3 and 4 which is adapted to control transmission drive arrangements of the type shown in FIG. 2 and described above. Generally, the transmission control system is operable to establish the transmission in neutral and park conditions and to provide three selective forward range conditions providing different modes of operation and also to provide a reverse drive condition.

PUMP

The fluid such as oil used in the control system is returned to a sump 94 via various exhausts in the system's components, the sump being secured to the underside of the transmission housing 18. Fluid pressure for the control system is supplied by a positive displacement pump 95 of the internal-external gear type which is housed in a space 96 provided in the front bulkhead 32. The pump's drive gear 98 (external toothed gear) is keyed to shaft 34 so that the pump is driven when the vehicle's engine is running. The engine driven pump 95 draws fluid from sump 94 through an intake line 99. Fluid is delivered from pump 95 to a main line 100. Main line 100 is always connected to deliver fluid to a main line pressure regulator valve 102, an accumulator 103, a modulator valve 104, a modulator trim valve 106, a main line boost low and intermediate valve 107, and a manual valve 108.

MANUAL VALVE

The manual valve 108 determines the operation of the control system and thus that of the transmission drive arrangement and comprises a spool valve element 110 having spaced lands $a$, $b$, $c$, $d$ and $e$ of equal diameter located in bore 111 of the valve body. The valve element 110 is movable to six positions which are Park (P), Reverse (R), Neutral (N), Drive range (D), intermediate range ($L_2$) and low range ($L_1$). The valve element 110 is adapted at its left end to be operated through suitable conventional linkage by the operator of the vehicle who manually selects the valve's position.

When the valve element 110 is in the D position as shown, main line 100 is connected between lands $c$ and $d$ to a drive range line 112 and also to a boost line 114. When valve element 110 is moved to the $L_2$ position, main line 100 remains connected to drive range line 112 and is in addition connected between lands $d$ and $e$ to an intermediate range line 115 while land $c$ now blocks the main line 100 from boost line 114. When valve element 110 is moved to the $L_1$ position, the main line 100 remains connected to both the range line 112 and the intermediate range line 115, the latter connection now being provided between lands $c$ and $d$, and the main line 100 is in addition connected between lands $c$ and $d$ and then between lands $d$ and $e$ to a low range line 116 while the boost line 114 remains blocked from the main line 100 by land $c$. When valve element 110 is moved to the N position, the main line 100 is connected between lands $c$ and $d$ to boost line 114 and is blocked from all other passages leading from this valve. When valve element 110 is moved to the R position, the main line 100 remains connected to boost line 114 and is in addition connected between lands $c$ and $d$ to a reverse apply line 118 which has a flow restriction 119 and is directly connected to chamber 66 of the servo motor that engages the high and reverse clutch 61. When valve element 110 is moved to the P position, the main line 100 is blocked by land $e$ so that main line pressure is prevented from reaching any of the passages in the valve.

Two exhausts 122 and 123 are connected to bore 111 of the manual valve as shown so that in the P position, the exhaust 122 is connected to only the reverse apply line 118 and boost line 114 while the other exhaust 123 is connected to only the low range line 116, intermediate range line 115 and drive range line 112. In the R position, exhaust 122 is blocked by land $c$ while exhaust 123 is connected to only the low range line 116, intermediate range line 115 and drive range line 112. In the N position, the exhaust 122 is connected to the reverse apply line 118 while exhaust 123 is connected to only the low range line 116, intermediate range line 115 and drive range line 112. In the D position, the exhaust 122 is connected to only the reverse apply line 118 while the exhaust 123 is connected to the low range line 116 and the intermediate range line 115. In the $L_2$ position, the exhaust 122 is connected to only the reverse apply line 118 and boost line 114 while the other exhaust 123 is connected to only the low range line 116. In the $L_1$ position, the exhaust 122 is connected to only the reverse apply line 118 and boost line 114 while exhaust 123 is blocked from all the fluid passages by land $e$.

GOVERNOR VALVE

A governor valve 124 has a driven gear 126 adapted to mesh with a drive gear 127 secured to the transmission output shaft 16. The governor valve 124 is preferably of the type disclosed in U.S. Pat. No. 2,762,384, issued to M. S. Rosenberger and receives fluid from the drive range line 112 and operates to provide in a governor line 129 a governor pressure which increases with increasing vehicle speed. For a more detailed description of the operation of the governor valve, reference may be made to the aforementioned Rosenberger patent.

MODULATOR VALVE

Modulator valve 104 provides a pressure which is a function of engine torque. Modulator valve 104 is controlled by a vacuum modulator 130 which is connected to the engine's intake manifold through a nipple 131 and a tube which is not shown. Vacuum modulator 130 is preferably of the type disclosed in U.S. Pat. No. 3,295,388 issued to R. C. Groves and provides a leftwardly acting modulator output force on an output member 133 which force increases with increasing engine torque as indicated by intake manifold pressure and is corrected for changes in engine torque resulting from changes in ambient atmospheric pressure. For a more detailed description of the operation of the vacuum modulator, reference may be made to the aforementioned Groves patent.

The modulator valve 104 comprises a spool valve element 134 having spaced lands $a$ and $b$ of equal diameter located in bore 135 of the valve body. Valve element 134 also has a stem 137 engaged by the modulator output member 133 so that the modulator output force biases valve element 134 leftward. A modulator line 138 is connected to bore 135 always between lands $a$ and $b$ and is in addition always connected through valve element 134 by a passage 139 having a flow restriction 140 to a chamber 141 at the left end of the valve element.

When valve element 134 is in the position shown, the main line 100 is connected past the edge of land $a$ and between lands $a$ and $b$ to the modulator line 138. Fluid in line 138 is delivered through flow restriction 140 to chamber 141 so that pressure builds in this chamber to urge the valve element rightward against the leftward bias of modulator 130. With sufficient rightward movement of valve element 134, land $a$ blocks main line 100 while connecting the downstream modulator line 138 to an exhaust 142. Assuming a constant leftward biasing force from modulator 130, modulator valve 104 thus provides a regulated pressure which will be called modulator pressure in modulator line 138 determined by this modulator bias. Varying modulator bias varies modulator pressure and thus the modulator valve 104 operates to increase the modulator pressure in modulator line 138 from zero at engine idle to a suitable maximum value with increasing engine torque or throttle opening as illustrated by the dashed line in FIG. 5. An exhaust 143 exhausts bore 135 between valve element 134 and member 133.

MODULATOR TRIM VALVE

The modulator trim valve 106 provides a pressure which is a function of both engine torque and vehicle speed and comprises a spool valve element 146 having spaced and progressively larger lands $a$, $b$ and $c$ located in an accommodating stepped bore 147 of the valve body. The governor line 129 is connected to a chamber 148 so that governor pressure acts rightward on land $a$ of valve element 146. The modulator line 138 is connected through a flow restriction 149 to a chamber 150 so that modulator pressure acts leftward on land $c$ of valve element 146 against the governor bias. A modulator trim line 151 is connected to bore 147 always between lands $a$ and $b$. Assuming there is no governor pressure, modulator pressure urges valve element 146 leftward to open main line 100 to deliver fluid between lands $a$ and $b$ to the modulator trim line 151. The pressure that builds in modulator trim line 151 which will be called modulator trim pressure acts on the unbalanced land $b$ to urge valve element 146 rightward to connect the modulator trim line 151 to an exhaust 152 while land $a$ closes off main line 100. Thus, the modulator trim pressure is a regulated pressure which is zero at zero modulator pressure and increases with increasing modulator pressure. Assuming now that governor pressure is present, such pressure adds a rightward bias to valve element 146 opposing the modulator pressure bias. Thus, the modulator trim pressure provided by the modulator trim valve 145 increases with increasing modulator pressure or engine torque and decreases with increasing governor pressure or vehicle speed. An exhaust 153 connected to the bore 147 exhausts this bore between lands $b$ and $c$ of any leakage past these lands.

MAIN LINE BOOST LOW AND INTERMEDIATE VALVE

The main line boost low and intermediate valve 107 provides for boosting main line pressure to a high value in both low and intermediate range operation. Valve 107 comprises a spool valve element 154 having a land $a$ and a larger land $b$ spaced therefrom located in an accommodating stepped bore 155 of the valve body. A spring 157 biases valve element 154 leftward toward a boost position where the main line 100 is connected between lands $a$ and $b$ to the modulator trim line 151 downstream of a flow restriction 158 in the latter line. The boost line 114 is connected to a chamber 161 so that pressure from this line acts on land $a$ of valve element 154 to urge it rightward against the bias of spring 157 toward a non-boost position where the main line 100 is blocked at bore 155 by land $a$ and the modulator trim line 151 is openly connected between lands $a$ and $b$ to bypass flow restriction 158. The pressure in the modulator trim line 151 downstream of flow restriction 158 acts on the unbalanced land $b$ so that this pressure is maintained at a minimum value for low and intermediate range operation when chamber 161 is exhausted. This controls the minimum value of main line pressure in line 100 in low and intermediate range operation and also in Park.

MAIN LINE PRESSURE REGULATOR VALVE

The main line pressure regulator valve 102 regulates the pressure in main line 100 and comprises a spool valve element 162 having spaced lands a, b and c of equal diameter located in a bore 163 of the valve body. Fluid from pump 95 is delivered via main line 100 to a valve element 162 always between lands a and b and then through a passage 165 having a flow restriction 166 to a chamber 167, passage 165 being provided in this valve element. Fluid pressure in chamber 167 acts to bias the valve element 162 upward with a spring 168 assisting this upward pressure bias. Spring 168 is seated on a screw 169 which is externally adjustable and provides for accurate adjustment of main line pressure.

The upper end of valve element 162 contacts a spool valve element 170 having a land a and a larger land b located in an accommodating stepped bore 171 of a cylinder 172 which is retained in the body by a retaining ring 174. An exhaust 173 is connected to exhaust the space between valve elements 162 and 170 to prevent hydraulic lock. The valve element 170 and cylinder 172 form a chamber 175 which is connected to the modulator trim line 151 downstream of flow restriction 158 to provide main line pressure boost as described in more detail later. The reverse apply line 118 is always connected to valve element 170 between lands a and b so that fluid pressure from the reverse line may be used to boost main line pressure as described in more detail later.

The valve element 162 is normally biased to the position shown by a spring 176 and with pump pressure supplied to chamber 167, valve element 162 is urged upward by this pressure against the bias of spring 176 to regulate pressure in main line 100 at a value determined by the spring bias with the overage being exhausted first between lands a and b to a converter feed line 177 and then between lands b and c to the pump intake line 99 on continued upward valve element movement. The converter feed line 177 is connected to deliver fluid to converter 10 as shown. Fluid is returned from the converter by a line 178 through a cooler 179 to lubricate the transmission before being returned to the sump.

The above described main pressure regulation assumes that only spring bias is determining main line pressure. Considering now that pressure from the modulator trim line 151 acts in chamber 175 on land a of valve element 170, this valve element is urged downward and assists the spring 176 in controlling main line pressure. In drive range, this assisting pressure is modulator trim pressure and thus main line pressure is made a function of both engine torque and vehicle speed and is thus caused to increase with increasing engine torque and decreasing vehicle speed. In low and intermediate range, this assisting pressure is maintained above a minimum value and thus main line pressure is maintained above a minimum value which will be called a boosted value. In reverse, main line pressure in reverse apply line 118 acts on the unbalanced area of land b of valve element 170 in addition to modulator trim pressure acting on land a to boost main pressure in main line 100 to the highest boosted value.

DETENT VALVE

A detent valve 180 provides for forced downshifting and also controls conditioning of the shift schedule. Valve 180 comprises a spool valve element 181 having spaced lands a, b and c of equal diameter located in a bore 182 of the valve body. A spring 183 normally yieldingly holds valve element 181 in the position shown which will be called the normal position. The boost line 114 is connected to a chamber 184 at the right end of valve element 181 and this chamber is always connected through a passage 185 having a flow restriction 186 to a chamber 187 at the left end of the valve element, passage 185 being provided in the valve element. A solenoid valve 189 has a poppet valve element 190 which, when the solenoid is deenergized as shown, is spring biased to close an exhaust port 191 to chamber 187. In that condition, any pressure from boost line 114 delivered to chamber 184 also builds in chamber 187 to permit spring 183 to hold valve element 181 in the normal position since the valve element is pressure balanced. In this position the boost line 114 is blocked by land c from a limited feed line 194, the modulator line 138 is connected between lands b and c to the limited feed line 194, a limited modulator line 195 is blocked by land a and a dentent line 197 is connected between lands a and b to an exhaust 198. When solenoid valve 189 is energized, the poppet valve element 190 is moved to open exhaust port 191 so that pressure cannot build in chamber 187. Then, pressure from boost line 114 acting on land c will move valve element 181 leftward to a detent position since the valve element is now pressure unbalanced. In the detent position, the boost line 114 is connected past land c to the limited feed line 194, the modulator line 138 is blocked between lands b and c, the exhaust 198 is blocked by land b and the limited modulator line 195 and detent line 197 are connected between lands a and b.

The solenoid valve 189 is controlled by an electrical circuit 201 which may utilize the vehicle storage battery 202 as a power source and has a switch 203 which is normally open. An accelerator or throttle pedal 205 which controls the engine's throttle valve is arranged so that when it is moved near a position corresponding to wide open engine throttle or through dentent, it closes the switch 203 to complete the circuit to energize solenoid valve 189.

MODULATOR SCHEDULE AND LIMIT VALVE

A modulator schedule and limit valve 206 provides a pressure in limited modulator line 195 for controlling shifting this pressure hereinafter being called modulator shift schedule pressure and illustrated by the solid line in FIG. 5. This valve comprises a spool valve element 208 having a land a and a larged land b spaced therefrom located in an accommodating steps portion of a bore 209 in the valve body. This valve also has another spool valve element 210 having a spaced lands a and b of equal diameter located in an unstepped portion of bore 209. The valve elements 208 and 210 are normally urged apart by a spring 213 to their extreme outward positions as shown which will be called the valve's light engine throttle condition since it will occur during light engine throttle operation as described in more detail later. In this condition the limited feed line 194 is connected between lands a and b of valve element 208 to a modulator schedule line 214. In addition, the modulator schedule line 214 is connected between lands a and b of the other valve element 210 to the limited modulator line 195, the drive range line 112 is blocked by land a of valve element 208 and an exhaust 216 is blocked by land b of the other valve element 210. An exhaust 217 is always connected to exhaust fluid from between the valve elements 208 and 210 to prevent hydraulic lock. The limited modulator line 195 is always connected between lands a and b of valve element 210 through a flow restricting passage 220 therein to a chamber at the upper end of valve element 210. The spring 213 has a bias which is large enough so that when the engine is operating at light throttle, it holds valve element 210 in its uppermost or light throttle position against the modulator pressure in chamber 221 supplied from the modulator line 138 via limited feed line 194 and modulator schedule line 214. Thus the modulator shift schedule pressure delivered to the limited modulator line 195 in this valve condition is equal to modulator pressure as indicated between points A and B in FIG. 5. The limited feed line 194 is also connected to a chamber 222 so that modulator pressure acts on land b of valve element 208 to urge this valve element upward. At a predetermined intermediate modulator pressure which will occur at an intermediate engine throttle opening or engine torque as indicated by the point B in FIG. 5, this modulator pressure is effective to move valve element 208 upward against spring 213 to position land *b* of this valve element to close the connection between the limited feed line 194 and modulator schedule line 214 while providing for connection of the drive range line 112 to the modulator schedule line 214 between lands *a* and *b* with continuing upward valve element movement increasing the opening of this latter fluid connection. Pressure in the downstream modulator schedule line 214 acts on the unbalanced area of land *b* of valve element 208 to urge it downward against the upward bias provided by modulator pressure and thus the valve element 208 now acts to regulate the pressure in the modulator schedule line 214. The pressure delivered by the modulator schedule line 214 to chamber 221 is still not high enough to move valve element 210 downward and thus, above the aforementioned predetermined intermediate modulator pressure the modulator shift schedule pressure in line 195 is obtained from main line pressure supplied by drive range line 112 and is regulated by the action of valve element 208. This condition of valve 206 will be referred to as its medium engine throttle condition. Since the upward bias on valve element 208 increases with increasing modulator pressure, the modulator shift schedule pressure in line 195 increases with increasing engine torque or engine throttle opening and at a rate faster than modulator pressure in the modulator schedule and limit valve's medium engine throttle conditions as indicated between point B and C in FIG. 5. At full engine throttle opening through detent, the boost line 114 is connected to the limited feed line 194 so that when main line pressure is made available to this line it acts in chamber 222 on land *b* of valve element 208 and moves this valve element further upward and against a shoulder 223. In this position, the drive range line 112 is fully opened to the modulator schedule line 214 so that chamber 221 then receives full main pressure when it is available from the drive range line 112. The upward bias provided by spring 213 in this position of valve element 208 establishes a regulating bias on the valve element 210 to provide for regulating the pressure in the limited modulator line 195 at a pressure which may be below full main line pressure. The pressure acting on land *a* of valve element 210 urges this valve element downward against spring 213 so that land *a* closes off the modulator schedule line 214 and then the limited modulator line 195 is connected between lands *a* and *b* of this valve element to an exhaust 216. This condition of valve 206 will be referred to as its full or wide open engine throttle through detent condition. Thus, a full engine throttle opening through detent, the modulator shift schedule pressure in line 195 as indicated at point D in FIG. 5 is obtained from main line pressure supplied by drive range line 112 and is regulated by the action of valve element 210 so that it remain at a constant predetermined regulated pressure value.

1-2 SHIFT VALVE

A 1-2 shift valve 225 provides for shifting between first and second or low and intermediate drive and also provides for establishment of reverse drive. Valve 225 comprises a pair of spool valve elements 226 and 227. Valve element 226 has spaced lands *a* and *b* of equal diameter, a larger diameter land *c* spaced from land *b* and an even larger diameter land *d* spaced from land *c* located in an accommodating stepped portion of a bore 228 in the valve body which portion is formed by a cylinder as shown. The other valve element 227 has spaced lands *a*, *b* and *c* which are progressively smaller located in an accommodating stepped portion of bore 228. The two valve elements 226 and 227 are normally biased rightward by a spring 229 to a downshift position as shown. In the downshift position, the limited modulator line 195 is connected via a port 230 to a chamber 231 where pressure from the limited modulator line 195 acts on land *a* to assist spring 229 in urging the valve elements rightward. The governor line 129 is connected to a chamber 232 at the right end of valve element 227 and is also connected by this chamber and a passage 233 in valve element 227 to a chamber 234 so that governor pressure acts leftward on land *c* of valve element 227 and also acts leftward on the unbalanced land *a* of this valve element to oppose the downshift bias provided by spring 229 and from pressure in chamber 231. In the downshift position, the detent line 197 is blocked from chamber 231 by land *a* of valve element 226, one branch of the reverse apply line 118 is blocked by land *b* of valve element 226 and the low range line 116 is connected between lands *b* and *c* of this valve element to a low and reverse apply line 235 that is connected to the apply chamber 85 of the low and reverse servo 86. In the downshift position there is, in addition, connection of another branch of the reverse apply line 118 between lands *b* and *c* of valve element 227 to an intermediate apply line 236 while land *b* of this valve element blocks the drive range line 112 at the valve bore. A third branch of the reverse apply line 118 is connected to bore 228 always between the two valve elements 226 and 227. The intermediate apply line 236 is always connected through a flow resrtriction 237 to the apply chamber 75 of the intermediate servo 73 and a check valve 238 in parallel with flow restriction 237 provides for rapid flow from this chamber.

When governor pressure bias is sufficient to overcome the bias of spring 229 and any modulator shift schedule or detent pressure bias as described in more detail later, the valve elements move leftwardly to an upshift position. In the upshift position, the limited modulator line 195 is blocked from chamber 231 by land *a* of valve element 226, the detent line 197 is connected between lands *a* and *b* of this valve element to chamber 231, the reverse apply line 118 is connected between lands *b* and *c* of this valve element to the low and reverse apply line 235 and the low range line 116 is connected to bore 228 between lands *c* and *d* of this valve element. Also in the upshift condition, the drive range line 112 is connected through a flow of restriction 239 and then between lands *b* and *c* of the valve element 227 to the intermediate apply line 236 while land *c* of this valve element blocks this latter line from the reverse apply line 118.

2-3 SHIFT VALVE

A 2-3 shift valve 240 provides for shifting between the second and third or intermediate and high drive and comprises a pair of spool valve elements 241 and 242. The valve element 241 has a land *a* and a larger land *b* spaced therefrom located in an accommodating stepped portion of a bore 244 in the valve body which portion is formed by a cylinder as shown. The valve element 242 has lands *a*, *b* and *c* of progressively smaller diameter located in an accommodating stepped portion of bore 244. The limited modulator line 195 is connected to a chamber 248 at the left end of valve element 241 so that pressure supplied from this line acts on land *a* of this valve element and urges the valve elements rightward toward a downshift position, there being provided a spring 249 to normally yieldingly hold valve element 242 in the downshift position as shown. The governor line 129 is connectible by a 1-2-3 sequence valve 250 to a chamber 251 at the right end of valve element 242 and this chamber is connected by a passage 252 in this valve element to another chamber 253. When governor pressure is made available to the 2-3 shift valve 240 by the 1-2-3 sequence valve 250, it acts on land *c* of valve element 242 and also acts on the unbalanced land *a* of this valve element to urge the valve elements leftward toward an upshift position against whatever pressure bias exists on valve element 241 and the bias of spring 249. In the downshift position shown, the detent line 197 is blocked from chamber 248 by land *a* of valve element 241 and the limited modulator line 195 is connected via chamber 248 and a port 254 to valve element 241 between lands *a* and *b*. Also in the downshift position, land *b* of the other valve element 242 blocks the drive range line 112 while the reverse apply line 118 is connected through a flow restriction 255 and then between lands $b$ and $c$ of valve element 242 to a high apply line 256. The high apply line 256 is connected to chamber 67 of the servo that engages the high and reverse clutch 61 and is also connected to release chamber 76 of the intermediate servo 73. When governor pressure is high enough to move the valve elements 241 and 242 to their extreme leftward position which is the upshift position, the detent line 197 is connected between lands $a$ and $b$ of valve element 241 while the drive range line 112 is connected through a flow restriction 257 and then between lands $b$ and $c$ of valve element 242 to the high apply line 256. A ball check valve 258 operates to connect intermediate range line 115 to bore 244 between valve elements 241 and 242 when this line is supplied with pressure and, alternatively, operates to connect the reverse apply line 118 to this same location when the latter line is supplied with pressure.

1-2-3 SEQUENCE VALVE

The 1-2-3 sequence valve 250 provides for sequence shifting and comprises a spool valve element 259 having lands $a$ and $b$ of equal diameter located in a bore 260 of the valve body. A spring 261 normally biases valve element 259 to a shift-permit position as shown where it provides a through connection for the governor line 129 to the 2-3 shift valve 240 while land $b$ blocks an exhaust 262. The drive range line 112 is connected to a chamber 264 at the left end of valve element 259 and when drive range pressure is available, it acts on land $a$ to move the valve element rightward to a shift-prevent position where land $a$ prevents the governor line 129 from delivering governor pressure to the 2-3 shift valve 240. In the shift-prevent position of the sequence valve 250 the governor line 129 downstream of this valve is connected between lands $a$ and $b$ to the exhaust 262. The intermediate apply line 236 is connected downstream of flow restriction 237 and check valve 238 to a chamber 265 at the right end of the valve element 259 so that when pressure is available in this line, it balances drive range pressure in chamber 264 so that spring 261 is effective to hold valve element 259 in the position shown.

DOWNSHIFT TIMING VALVE

A 3-2 downshift timing valve 266 times downshifts from high drive to intermediate drive and comprises a spool valve element 268 having spaced lands $a$ and $b$ of equal diameter located in a bore 269 of the valve body. The governor line 129 is connected at a point upstream of the 1-2-3 sequence valve 250 to a chamber 270 at the right end of valve element 268 so that governor pressure acts on land $b$ to urge the valve element leftward. The valve element 268 is normally biased rightward by an inner spring 272 to a fast flow rate position as shown where there is provided an open connection between lands $a$ and $b$ in the high apply line 236 in parallel with flow restriction 237 in this line. The downshift timing valve 266 is a three position valve and when governor pressure is sufficiently high enough to move valve element 268 leftward against the bias of spring 272 to an intermediate flow rate position where it contacts a spring seat 274, flats 275 on land $b$ are positioned to provide a flow restriction in parallel with the flow restriction 237 so that flow through the intermediate apply line 236 is reduced. An outer spring 276 acts rightward on spring seat 274 so that a higher governor pressure is required to move the valve element further leftward since now it must be moved against the added bias of spring 276. When valve element 268 is moved by governor pressure to its extreme left-hand position which will be called its slow flow rate position, the land $b$ is positioned to block the intermediate apply line 236 at bore 269 so that only the flow restriction 237 provides restriction to flow in this line.

ACCUMULATOR

The one accumulator 103 is for smoothing an upshift to intermediate drive and also shifting between the intermediate and high drives. Accumulator 103 comprises a piston 277 having a land $a$ and a larger land $b$ located in an accommodating stepped bore 278 of the valve body. The accumulator has three separate chambers 280, 281 and 282 respectively exposing all of land $a$, the unbalanced area of land $b$ and all of land $b$. A spring 284 normally biases piston 277 to the position shown. The main line 100 is connected to chamber 280 through a ball check valve 285 that is in parallel with a flow restriction 286, the check valve 285 providing for rapid filling of chamber 280 and the flow restriction 286 providing for slow fluid flow therefrom. Main line pressure in chamber 280 acts on piston 277 to assist spring 284 in holding the piston in the position shown. The high apply line 256 and the intermediate apply line 236 are connected to chambers 281 and 282, respectively. When pressure is made available to the intermediate apply line 236 for an upshift to intermediate drive, fluid first fills the apply chamber 75 of the intermediate servo 73 and chamber 282 and then as pressure begins to build to the main line pressure value, it acts in chamber 282 to move piston 277 against the bias of spring 284 and with escape of fluid from chamber 280 being restricted by the flow restriction 286, there is provided a gradual buildup of pressure in apply chamber 75. Then when pressure is made available to the high apply line 256 for an upshift to high drive, fluid first fills the chamber 67 of the high and reverse clutch 61, the release chamber 76 of the intermediate servo 73 and chamber 281 and then as pressure begins to build to the main line pressure value, it acts in chamber 281 on the unbalanced land $b$ and together with the bias of spring 284 moves piston 277 to contract chamber 282 which has main line pressure. With the escape of fluid from chamber 282 restricted by flow restriction 239 in the drive range line 112, there is provided a gradual pressure buildup in chamber 67. The accumulator 103 is then conditioned to smooth reestablishment of the intermediate drive on a downshift in the same manner as described on an upshift to intermediate drive.

CONTROL SYSTEM OPERATION

The control system whose structure has been described above is operable to provide manual selection of park, reverse, drive, and neutral. The control system is also operable to provide manual selection of automatic shifting between all forward drives and just between the intermediate and low drives and also provides for holding the low drive.

PARK POSITION

For parking the vehicle, the operator places the manual valve 108 in its P position and with the engine idling, the pump 95 delivers fluid via main line 100 to the main line pressure regulator valve 102, accumulator 103, modulator valve 104, modulator trim valve 106, main line boost low and intermediate valve 107 and the manual valve 108. The manual valve 108 in this position blocks the main line 100 from all the lines leading from this valve and at the same time exhausts all the latter lines. Thus, all the fluid pressure operated friction drive establishing devices are released and there can be no drive through the transmission. With the engine idling, modulator pressure is zero and thus modulator trim pressure is zero. Since the boost line 114 is exhausted, the main line boost low and intermediate valve 107 is conditioned in its boost condition. The pressure supplied by the modulator trim line 151 to chamber 175 of the main line pressure regulator valve 102 is above a minimum high value as determined by spring 157 of the main line boost low and intermediate valve 107 and causes regulation of main line pressure at a constant high value. Overage from the main line pressure regulator valve 102 charges the converter 10 and with the converter filled, the fluid exiting therefrom is directed through the cooler 179 and thence to lubricate the friction parts of the transmission, the fluid after these uses being returned to sump 94. The main line pressure delivered to accumulator 103 acts in chamber 280 to assist spring 284 in holding the accumulator piston 277 in the position shown and thus ready for later action.

REVERSE DRIVE POOSITION

When the operator moves the manual valve 108 to its R position, the main line 100 is then connected to both the boost line 114 and the reverse apply line 118. Fluid thus delivered to reverse apply line 118 flows through the flow restriction 119 directly to chamber 66 of the high and reverse clutch 61 and is also delivered to the 1-2 shift valve 225. The pressure from the reverse apply line 118 acts on land $d$ of valve element 226 to move it against spring 229 to its upshift position where it connects the reverse apply line 118 between lands $b$ and $c$ to the low and reverse apply line 235 which supplies the apply chamber 85 of the low and reverse servo 86. The pressure from the reverse apply line 118 also acts on land $a$ of valve element 227 of the 1-2 shift valve 225 to assist in holding this valve element in its downshift position in which it connects the reverse apply line 118 to the intermediate apply line 236 that is connected to the apply chamber 75 of the intermediate servo 73. At the same time, the reverse apply line 118 is connected by check valve 258 to the 2-3 shift valve 240 where its acts on land $a$ of valve element 242 to assist spring 249 in holding this valve element in its downshift position where it connects the reverse apply line 118 through the flow restriction 255 to the high apply line 256 which delivers fluid to chamber 67 of the high and reverse clutch 61 and also to the release chamber 76 of the intermediate servo 73. Since in the intermediate servo 73 both the apply chamber 75 and release chamber 76 are supplied with pressure from main line 100 simultaneously as above described, the intermediate servo 73 does not engage the intermediate brake 70. Thus, both the high and reverse clutch 61 and the low and reverse brake 84 are engaged to establish the reverse drive with both chambers 66 and 67 of the high and reverse clutch 61 being supplied with fluid pressure to provide this clutch with a large torque capacity for the reverse drive. The main line boost low and intermediate valve 107 is conditioned in its non-boost condition since main line pressure is now supplied to boost line 114. Thus, modulator trim pressure is now made available bypassing flow restriction 158 to the main line pressure regulator valve 102 where it acts in chamber 175 to increase main line pressure with increasing engine torque. In addition, main line pressure is also supplied by the reverse apply line 118 to act on the unbalanced land $b$ of the main line pressure regulator valve element 170 so that main line pressure regulator valve 102 regulates main line pressure at its highest values. Since there is no governor pressure provided in this position of the manual valve 108, the modulator trim pressure is not a function of vehicle speed. Thus, main line pressure for effecting reverse drive increases with increasing engine torque and is unaffected by change in vehicle speed which has been found to provide a very satisfactory match between the torque capacity of the friction drive establishing devices establishing the reverse drive and the torque they are required to handle.

NEUTRAL POSITION

When the manual valve 108 is moved to its N position, the main line 100 remains connected to the boost line 114 while all other lines leading from this valve are exhausted. Thus, the 1-2 shift valve 225 resumes its normal downshift position so that all of the fluid operated friction drive establishing devices are again disengaged so that no drive can be transmitted through the transmission. Since the reverse apply line 118 is now exhausted, the main line pressure regulator valve 102 reserves only modulator trim pressure to assist spring 176 in controlling main line pressure, the modulator trim pressure again being main line pressure since there is no governor pressure.

DRIVE RANGE POSITION

When the operator moves the manual valve 108 to its D position, the main line 100 remains connected to the boost line 114 and is in addition connected to the drive range line 112. The drive range line 112 delivers fluid at main line pressure directly to chamber 56 of the forward drive clutch 50 to engage this clutch and thus establish the low drive. The drive range line 112 also delivers fluid at main line pressure to the 1-2 shift valve 225, 2-3 shift valve 240, modulator schedule and limit valve 206, 1-2-3 sequence valve 250 and governor valve 129. Thus, the governor valve 124 is now effective to produce governor pressure in the governor line 129 and therefore the modulator trim pressure in line 151 provided by modulator trim valve 106 will increase with increasing engine torque and decreasing vehicle speed. Modulator trim pressure operates on the main line pressure regulator valve 102 to control the main line pressure so that it increases with increasing engine torque and decreasing vehicle speed. With the vehicle at rest and therefore zero governor pressure, the 1-2 shift valve 225 is in its normal downshift position. Main line pressure from the drive range line 112 operates on the 1-2-3 sequence valve 250 to bias it to its shift-prevent position preventing any governor pressure supply to the 2-3 shift valve 240 which is also in its normal downshift position. The 1-2 shift valve 225 in its downshift position connects the intermediate apply line 236 to the reverse apply line 118 which is exhausted by the manual valve 108 in this position while blocking the drive range line 112 at this valve and also connects the low and reverse apply line 235 to the low range line 116 which is also exhausted by the manual valve 108 in this position. Thus, the brake 70 is not engaged by the intermediate servo 73 and the brake 84 is not engaged by the low and reverse servo 86. The 2-3 shift valve 240 in its downshift position connects the high apply line 256 to the exhausted reverse apply line 118 while blocking the drive range line 112 at this valve. Thus, the high and reverse clutch 61 is not engaged since both chambers 66 and 67 are exhausted.

The detent valve 180 is in its normal position exhausting the detent line 197 while connecting the modulator line 138 to the limit feed line 194. With the engine idling, the modulator schedule and limit valve 206 is in its light engine throttle condition and thus the modulator shift schedule pressure delivered to limited modulator line 195 is equal to modulator pressure which is zero at this engine condition as indicated in FIG. 5 at point A.

With low drive thus established and when the engine is accelerated by operation of the throttle pedal 205, governor pressure is then produced in governor line 129 to urge an upshift of the 1-2 shift valve 225, governor pressure being prevented at this time from urging an upshift of the 2-3 shift valve 240 since the 1-2-3 sequence valve 250 is in its shift-prevent position. Also with the presence of governor pressure, the modulator trim pressure is then caused to increase with increasing engine torque and decreasing vehicle speed and thus so is the main line pressure. When the upshift governor pressure bias is effective to overcome the downshift bias provided by modulator shift schedule pressure and the spring 229, the 1-2 shift valve 225 is moved to its upshift condition where it connects the drive range line 112 through the flow restriction 239 to the intermediate apply line 236 while maintaining the low and reverse apply line 235 exhausted by connecting the latter line to the exhausted reverse apply line 118. Thus, the apply chamber 85 of the low and reverse servo 86 remains exhausted so that the brake 84 remains disengaged.

Fluid is delivered from the main line 100 via range line 112 and the intermediate apply line 236 to chamber 282 of the accumulator 103 and chamber 75 of the intermediate servo 73. The chamber 281 of accumulator 103 and release chamber 76 of intermediate servo 73 are both exhausted since the high apply line 256 is connected by 2-3 shift valve 240 in its downshift position to the exhausted reverse apply line 118. When chamber 282 of accumulator 103 and apply chamber 75 of intermediate servo 73 are filled with fluid and pressure then begins to build, this pressure acting in chamber 282 urges the accumulator piston 277 against the spring 284 thereby forcing fluid in the chamber 280 through the flow restriction 286 back into the main line 100, the check valve 285 closing with this direction of fluid flow. Since the flow restriction 286 restricts flow from chamber 280 as the accumulator piston 277 is stroked, there is provided a gradual buildup of pressure in apply chamber 75 of the intermediate servo which thereby gradually engages the intermediate brake 70 to establish the intermediate drive, this pressure buildup continuing until full main line pressure is reached. Pressure buildup in the intermediate apply line 236 also operates on the 1-2-3 sequence valve 250 to position it in its shift-permit position connecting the governor line 129 to deliver governor pressure to the 2-3 shift valve 240.

The modulator shift schedule pressure as illustrated in FIG. 5 provides an early shift schedule for light to medium engine throttle openings and then rapidly extends this schedule with increasing engine throttle opening or engine torque. Thus, at a throttle opening between idle and an intermediate throttle opening as indicated between the points A and B in FIG. 5, a 1-2 upshift will occur at a predetermined vehicle speed; however this upshift will require a disproportionately higher vehicle speed at a wider throttle opening because of the change in the rate of change between modulator schedule pressure and engine throttle opening or engine torque as shown between points B and C in FIG. 5. It has been found that this dual shift schedule provides smoother shifting by providing a better match between engine torque, apply pressures and friction element torques than does a single pressure schedule such as would be provided by modulator pressure or modulator trim pressure.

When the 1-2 shift valve 225 is in its downshift position and the accelerator pedal 205 is moved through detent to condition the detent valve 180 in its detent position, the boost line 114 is connected to the limited feed line 194 so that the limited modulator line 195 then delivers maximum modulator schedule pressure to hold the 1-2 shift valve in its downshift position since the modulator schedule and limit valve 206 is then in its full engine throttle through detent condition. Thus, the 1-2 shift valve 225 is then provided with the largest available unshift resisting bias and when vehicle speed increases sufficiently so that governor pressure overcomes this increased bias, the 1-2 shift valve 225 will upshift to establish the intermediate drive as described previously but with this maximum resisting bias thus limiting maxmum vehicle speed in low drive.

When the 1-2 shift valve 225 is in its upshift position, the limited modulator line 195 is blocked from chamber 231 of this shift valve and instead is connected to the detent line 197 which, below wide open engine throttle, is exhausted by the detent valve 180 since the latter valve is then in its normal position. Thus, no part throttle 2-1 downshifts can occur since there is no modulator shift schedule pressure bias. The 1-2 shift valve 225 will downshift to reestablish the low drive when the bias of spring 229 overcomes the governor bias which will occur at a predetermined vehicle speed. Alternatively, when the 1-2 shift valve 225 is in its upshift position and the accelerator pedal 205 is in a position corresponding to full engine throttle opening through detent to condition the detent valve 180 in its detent position and thus conditions the modulator shift schedule and limit valve 206 in its full engine throttle through detent condition, the detent line 197 delivers maximum shift schedule pressure to chamber 231 where it adds to the bias of spring 229 and immediately forces the 1-2 shift valve 225 to its downshift position. With the 1-2 shift valve 225 again in its downshift position, the apply chamber 75 of the intermediate servo 73 is rapidly exhausted through the check valve 238 to rapidly release intermediate brake 70 and thus quickly restore the low drive while the other components of the control system are conditioned as before with the 1-2-3 sequence valve 250 preventing governor pressure delivery to the 2-3 shift valve 240.

When the 1-2 shift valve is in its upshift position establishing the intermediate drive and then when the vehicle speed increases to a speed such that the upshift governor pressure bias acting on the 2-3 shift valve 240 overcomes the modulator shift schedule pressure acting on both land $a$ and unbalanced land $b$ of the 2-3 shift valve element 241, the 2-3 shift valve 240 is moved to its upshift position. The 2-3 shift valve 240 in the upshift position connects the drive range line 112 through flow restriction 257 to the high apply line 256. The high apply line 256 is then connected via drive line 12 to deliver fluid from the main line 100 to chamber 67 of the high and reverse clutch 61, the release chamber 76 of the intermediate servo 73 and the chamber 281 of the accumulator 103. When these three chambers are filled with fluid and pressure begins to build, such pressure acts in chamber 67 to engage the high and reverse clutch 61, acts in chamber 76 to assist spring 80 in returning the piston 74 to its release position so that the intermediate servo 73 releases intermediate brake 70 and acts in chamber 281 to assist the main line pressure in chamber 280 and the spring 284 in returning the accumulator piston 277 to the position shown. Since the escape of fluid from both the apply chamber 75 of the intermediate servo 73 and the chamber 282 of the accumulator 103 is restricted by the flow restriction 239 in the drive range line 112, the check valve 238 which is located therebetween permitting free flow in this direction, there is provided gradual engagement of the high and reverse clutch 61 and disengagement of intermediate brake 70 which provides for smooth transition on this upshift to high drive.

The modulator shift schedule pressure operates on the 2-3 shift valve 240 like the way it operates on the 1-2 shift valve 225 as previously described to provide an early shift schedule for light to medium engine throttle 2-3 upshifts and then extends this 2-3 shift schedule rapidly with increasing engine throttle opening. When the 2-3 shift valve 240 is in its downshift position and the engine throttle pedal 205 is depressed through detent to condition the detent valve 180 in its detent position, the 2-3 shift valve 240 upshifts at a predetermined high vehicle speed according to the maximum upshift resisting bias provided by spring 249 and the maximum modulator shift schedule pressure which is being delivered by limited modulator line 195.

When the 2-3 shift valve 240 is in its upshift position, the limited modulator line 195 remains connected to chamber 248 of this valve so that there is provided part engine throttle 3-2 downshifting as compared with the 1-2 shift valve 225 which prevents part throttle 2-1 downshifting as described previously. The 2-3 shift valve 240 downshifts when the downshift bias provided by spring 249 and the modulator shift schedule pressure exceeds the upshift bias provided by governor pressure. A part throttle 3-2 downshift occurs at a lower vehicle speed than a 2-3 upshift for the same modulator shift schedule pressure or engine torque. This is because the modulator shift schedule pressure acted on both land $a$ and the unbalanced land $b$ of valve element 241 in the downshift position and acts only on land $a$ in the upshift position.

When the 2-3 shift valve 240 is in the upshift position and the engine throttle pedal 205 is depressed through detent to condition the detent valve 180 in its detent condition and the modulator schedule and limit valve 206 in its full engine throttle through detent condition, maximum modulator shift schedule pressure acts on both land *a* and the unbalanced land *b* of valve element 241 to immediately force the 2-3 shift valve 240 to its downshift position to reestablish the intermediate drive, the detent line 197 delivering this pressure to unbalanced land *b*.

When a 3-2 downshift occurs, the 3-2 downshift timing valve 266 will have been biased by governor pressure to establish the desired flow control metering area in the intermediate apply line 236 to meter flow to the apply chamber 75 of the intermediate servo 73 to establish the low drive. At low vehicle speeds, the 3-2 downshift timing valve 266 is positioned as shown in its fast flow rate to provide a fast 3-2 downshift. At an intermediate vehicle speed where governor pressure is increased to a predetermined intermediate value, the 3-2 downshift timing valve 266 is conditioned in its intermediate flow rate position to provide a slower 3-2 downshift. At a high vehicle speed where governor pressure is increased to a predetermined high value, the 3-2 downshift timing valve 266 is positioned in its slow flow rate position to provide an even slower 3-2 downshift. Thus, engagement of intermediate brake 70 is timed to release of the high and reverse clutch 61 at three different time rates which decrease with increasing vehicle speed to provide good operator feel, particularly for forced 3-2 downshifts.

The governor pressure responsive area and spring bias of the two shift valves 225 and 240 are selected so that the 1-2 shift valve 225 moves to its downshift position prior to the 2-3 shift valve 240 moving to its downshift position when the vehicle is coasting with the engine throttle closed, the modulator shift schedule pressure being zero in this condition. Thus, there is provided a zero engine throttle coast downshift from the high drive directly to the low drive, i.e. a zero engine throttle 3-1 downshift. This is desirable since such a 3-1 downshift in this drive train arrangement is made from a friction plate device to a one-way device and thereby avoids downshift clunk which may occur on a 3-2-1 downshift on the 3-2 shift in this sequence which would be from a friction plate clutch to a friction band. When the engine throttle is opened slightly providing drive torque, the resulting modulator shift schedule pressure and part throttle downshift characteristics of the 2-3 shift valve 240 result in a normal 3-2 and then a 2-1 downshift. It will also be appreciated that the 1-2-3 sequence valve 250, by its control over the delivery of governor pressure to the 2-3 shift valve 240 as described above, prevents a 1-3 upshift so that a 1-2-3 upshift sequence is assured. This sequence also allows accumulator 103 to be properly positioned for the 1-2 and 2-3 shifts.

INTERMEDIATE RANGE POSITION

When the manual valve 108 is moved to its $L_2$ position, the boost line 114 is then exhausted, the drive range line 112 remains connected to the main line 100 and in addition the intermediate range line 115 is connected to the main line 100. The main line boost low and intermediate valve 107 then connects the main line 100 to the modulator trim line 151 downstream of flow restriction 158 since boost line 114 is exhausted to permit this valve to be moved to its boost position. Thus, the main line pressure regulator valve 102 then regulates the main line pressure in main line 100 at a boosted value. Fluid at main line pressure is delivered by the intermediate range line 115 and then by check valve 258 to the 2-3 shift valve 240 where it acts on land *a* of valve element 242 to hold this valve element in its downshift position against whatever governor pressure is made available to chamber 251 of this valve. If the transmission is in high drive with the 2-3 shift valve 240 in its upshift position prior to such movement of the manual valve 108 to its $L_2$ position, the main line pressure bias will immediately move valve element 242 to its downshift position thus providing a 3-2 downshift whereafter the main line pressure bias will then hold this valve element in its downshift position. Thus, a 2-3 upshift is prevented. Otherwise, the control system operates as before to provide the low and intermediate drive with automatic shifting therebetween as described previously but with main line pressure now at a boosted minimum value.

LOW RANGE POSITION

When the manual valve 108 is moved to its $L_1$ position, the boost line 114 remains exhausted, both the drive range line 112 and intermediate range line 115 remain connected to the main line 100 and in addition, the low range line 116 is connected to main line 100. Thus, the main line pressure regulator valve 102 continues to regulate main line pressure at the boosted minimum value. The low range line 116 delivers fluid at main line pressure to the 1-2 shift valve 225 where it acts on unbalanced land *d* of valve element 226 to hold the 1-2 shift valve in its downshift position if this valve is already downshifted or to urge this shift valve to the downshift position if it is upshifted on movement of the manual valve 108 to the low range position whereafter this pressure bias will then hold the downshift position. With the 1-2 shift valve 225 in its downshift position, the low range line 116 is connected to the low and reverse apply line 235 so that the low and reverse servo 86 is operated to engage the low and reverse brake 84. Thus, in the low range, the low drive is established by engagement of the low and reverse brake 84 in addition to engagement of the forward drive clutch 50 so that engine braking is made available by the low drive in this low range.

The above described preferred embodiment is illustrative of the invention which may be modified within the scope of the appended claims.

I claim:

1. In a transmission control for use with a transmission in a drive train of an engine powered vehicle; a plurality of fluid pressure operated drive establishing means for establishing a plurailty of different speed range drives by control of fluid pressure delivery thereto; a source of fluid pressure; governor valve means connected to receive said fluid pressure for providing a governor pressure increasing with increasing vehicle speed; shift control pressure valve means connected to receive said fluid pressure for providing a shift control pressure increasing with increasing engine torque; a plurality of shift valve means responsive to said governor pressure and said shift control pressure for determining delivery of said fluid pressure to said fluid pressure operated drive establishing means to effect sequential downshifting through said drives when there is engine torque demand and, alternatively, to effect non-sequential downshifting when there is no engine torque demand; and sequence valve means for controlling the responsiveness of one of said shift valve means to said governor pressure to cause said plurality of shift valve means to effect sequential upshifting through said drives when there is engine torque demand.

2. In a transmission control for use with a transmission in a drive train of an engine powered vehicle; a plurality of fluid pressure operated drive establishing means for establishing three different speed range drives by control of fluid pressure delivery thereto; a source of fluid pressure; governor valve means connected to receive said fluid pressure for providing a governor pressure increasing with increasing vehicle speed; shift control pressure valve means connected to receive said fluid pressure for providing a shift control pressure increasing with increasing engine torque; a plurality of shift valve means responsive to said governor pressure and said shift control pressure for determining delivery of said fluid pressure to said fluid pressure operated drive establishing means to effect sequential downshifting through said three drives when there is engine torque demand and, alternatively, to effect downshifting directly from the highest speed range drive to the lowest speed range drive when there is no engine torque demand; and sequence valve means for controlling the responsiveness of one of said shift valve means to said governor pressure to cause said plurality of shift valve means to effect sequential upshifting through said three drives when there is engine torque demand.

3. In a transmission control for use with a transmission in a drive train of an engine powered vehicle; a plurality of drive establishing means including a friction band type device for establishing a plurality of different speed range drives with said friction band type device establishing an intermediate speed range drive; a plurality of fluid pressure operated means for controlling the operation of said drive establishing means; a source of fluid pressure; governor valve means connected to receive said fluid pressure for providing a governor pressure increasing with increasing vehicle speed; shift control pressure valve means connected to receive said fluid pressure for providing a shift control pressure increasing with increasing engine torque; a plurality of shift valve means responsive to said governor pressure and said shift control pressure for determining delivery of said fluid pressure to said fluid pressure operated means to effect sequential downshifting through all of said drives when there is engine torque demand, and, alternatively, to effect downshifting without establishing said intermediate speed range drive when there is no engine torque demand so that said friction band device is not operated to effect downshifting when there is no engine torque demand; and sequence valve means for controlling the responsiveness of one of said shift valve means to said governor pressure to cause said shift valve means to effect sequential upshifting through all said drives when there is engine torque demand.

4. In a transmission control for use with a transmission in a drive train of an engine powered vehicle; a source of fluid pressure; governor valve means connected to receive said fluid pressure for providing a governor pressure increasing with increasing vehicle speed; shift control pressure valve means connected to receive said fluid pressure for providing a shift control pressure increasing with increasing engine torque; first shift valve means responsive to both said governor pressure and said shift control pressure for controlling delivery of said fluid pressure to effect transmission shifting between a first speed range drive and a second speed range drive; second shift valve means responsive to said shift control pressure and also responsive to said governor pressure when governor pressure is delivered thereto for controlling delivery of said fluid pressure to effect transmission shifting between said second speed range drive and a third speed range drive; and sequence valve means for preventing delivery of said governor pressure to said second shift valve means when said first shift valve means is effecting establishment of said first speed range drive and responsive to the control of fluid pressure delivery by said first shift valve means that effects establishment of said second speed range drive to provide delivery of said governor pressure to said second shift valve means.

5. In a transmission control for use with a transmission in a drive train in an engine powered vehicle; a source of fluid pressure; first shift valve means for controlling delivery of said fluid pressure to effect establishment of a first speed range drive in a downshift position and, alternatively, to effect establishment of a second speed range drive in an upshift position; biasing means for normally biasing said first shift valve means to its downshift position; second shift valve means for controlling delivery of said fluid pressure to effect establishment of a third speed range drive on moveemnt from a downshift position to an upshift position; biasing means for normally biasing said second shift valve means to its downshift position; governor valve means connected to receive said fluid pressure for providing a governor pressure increasing with increasing vehicle speed; shift control pressure valve means connected to receive said fluid pressure for providing a shift control pressure increasing with increasing engine torque; said first shift valve means having governor pressure responsive means acted on by said governor pressure to provide an upshift bias for biasing said first shift valve means to its upshift position; said first shift valve means also having torque demand pressure responsive means acted on by said shift control pressure only in the downshift position of said first shift valve means to provide an upshift resisting bias for resisting said upshift bias; said second shift valve means having torque demand pressure responsive means acted on by said shift control pressure to provide a bias for biasing said second shift valve means to its downshift position; said second shift valve means also having governor pressure responsive means that when acted on by said governor pressure provides an upshift bias for biasing said second shift valve means to its upshift position; both said governor pressure responsive means and both said biasing means all being determined so that said first shift valve means moves to its downshift position before said second shift valve means moves to its downshift position when said shift control pressure is at a value indicating no engine torque demand; and sequence valve means for delivering said governor pressure to act on the governor pressure responsive means of said second shift valve means only when said first shift valve means is in its upshift position.

6. In a transmission control for use with a transmission in a drive train of an engine powered vehicle; a source of fluid pressure; first shift valve means for controlling delivery of said fluid pressure to effect establishment of a first speed range drive in a downshift position and, alternatively, to effect establishment of a second speed range drive in an upshift position; spring means for normally biasing said first shift valve means to its downshift position; second shift valve means for controlling delivery of said fluid pressure to effect establishment of a third speed range drive on movement from a downshift position to an upshift position; spring means for normally biasing said second shift valve means to its downshift position; governor valve means connected to receive said fluid pressure for providing a governor pressure increasing with increasing vehicle speed; shift control pressure valve means connected to receive said fluid pressure for providing a shift control pressure increasing with increasing engine torque; said first shift valve means having governor pressure responsive means acted on by said governor pressure to provide a bias for biasing said first shift valve means to its upshift positon; said first shift valve means also having torque demand pressure responsive means acted on by said shift control pressure to provide a bias for resisting movement of said first shift valve means to its upshift position; said second shift valve means having torque demand pressure responsive means acted on by said shift control pressure to provide a bias for biasing said second shift valve means to its downshift position; said second shift valve means also having governor pressure responsive means that when acted on by said governor pressure provides an upshift bias for biasing said shift valve means to its upshift position; both said governor pressure responsive means and both said spring means all being determined so that said first shift valve moves to its downshift position before said second shift valve means moves to its downshift position when said shift control pressure is at its lowest value; and sequence valve means for preventing delivery of said governor pressure to said governor pressure responsive means of said second shift valve means in a shift-prevent position and, alternatively, for establishing delivery of said governor pressure to said governor pressure responsive means of said second shift valve means in a shift-permit position; spring means providing a spring bias for biasing said sequence valve means to its shift-permit position; said sequence valve means having pressure responsive means responsive to said fluid pressure to provide a shift-prevent bias for opposing said spring bias to normally hold said sequence valve means in its shift-prevent position; said sequence valve means having additional pressure responsive means responsive to the fluid pressure delivery that establishes said second speed range drive to provide a shift-permit bias for assisting said spring bias and opposing said shift-prevent bias to move said sequence valve means to its shift-permit position.

References Cited
UNITED STATES PATENTS

| | | | |
|---|---|---|---|
| 2,766,639 | 10/1956 | Rosenberger | 74—863 X |
| 3,308,677 | 3/1967 | Van Lent et al. | 74—864 X |
| 3,309,939 | 3/1967 | Pierce, Jr. | 74—869 X |

ARTHUR T. McKEON, Primary Examiner

U.S. Cl. X.R.

74—869